Jan. 21, 1941. O. W. SCHOTZ 2,229,345
MOTOR VEHICLE DRIVE
Filed Nov. 18, 1937 4 Sheets-Sheet 1

INVENTOR
Otto W. Schotz.
BY
Harness, Dind, Pater & Harris
ATTORNEYS.

Jan. 21, 1941.  O. W. SCHOTZ  2,229,345

MOTOR VEHICLE DRIVE

Filed Nov. 18, 1937  4 Sheets-Sheet 2

INVENTOR
Otto W. Schotz.
BY
ATTORNEYS.

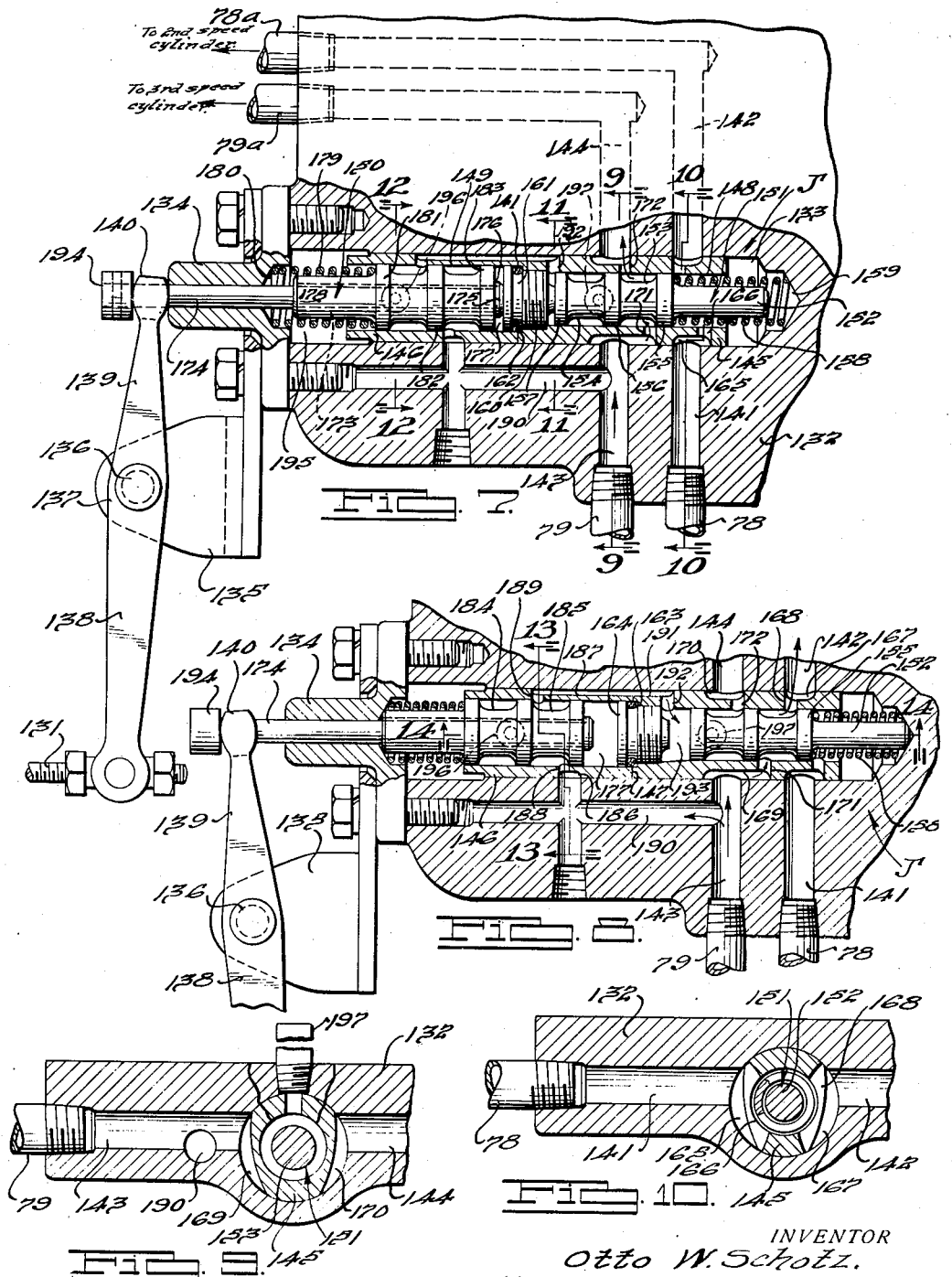

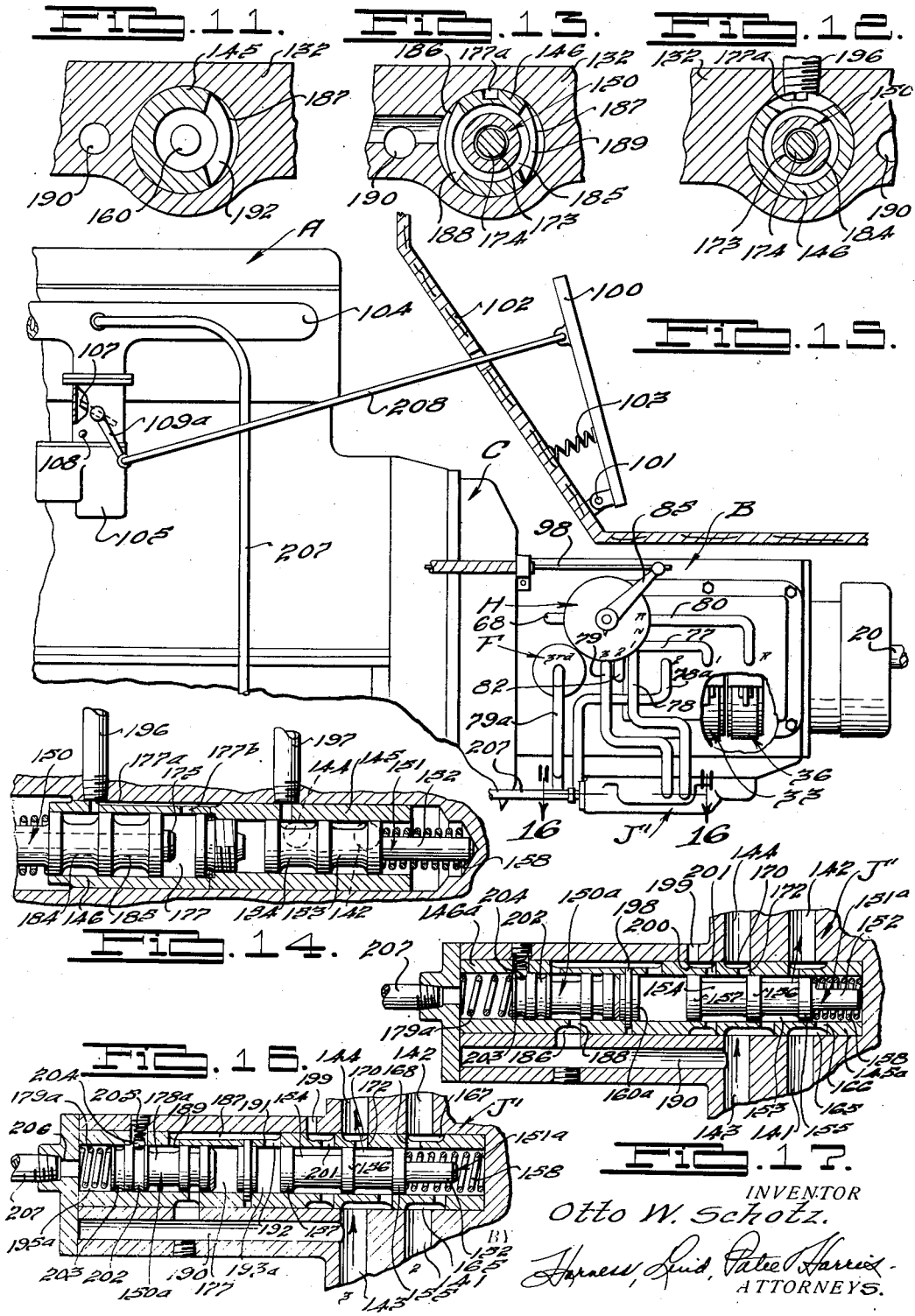

Patented Jan. 21, 1941

2,229,345

UNITED STATES PATENT OFFICE 2,229,345

MOTOR VEHICLE DRIVE

Otto W. Schotz, Detroit, Mich., assignor to Chrysler Corporation, Highland Park, Mich., a corporation of Delaware Application November 18, 1937, Serial No. 175,180

47 Claims. (Cl. 74—262)

This invention relates to power transmissions of the type used in conjunction with motor vehicle drives although in the broader aspects of my invention my transmission may be used in a variety of devices for controlling the drive between driving and driven parts.

One object of my invention is to provide improved means for controlling transmissions, particularly motor vehicle transmissions, whereby speed ratio change may be effected under desired conditions. More particularly I have provided primary means for selectively controlling the various speed ratio drives of a transmission, including direct drive, so arranged that the motor vehicle driver may cause a variation in the transmission speed ratio drive even though the primary selective controlling means would otherwise produce another speed ratio drive in the transmission.

A further object of my invention is to provide a motor vehicle transmission capable of variation of speed ratio drives and improved secondary or auxiliary means under control of the vehicle driver for changing the transmission setting, especially in response to driver variation of the load on the engine. Thus, the secondary control is preferably arranged to produce a step-down in the transmission drive to enable the engine to drive the vehicle at a lower gear ratio, the secondary control preferably being brought into action when the driver opens the engine throttle beyond a predetermined point and being released from action when the engine throttle is restored to a condition of opening less than the predetermined point.

In carrying out the foregoing objects of my invention, I preferably employ pressure fluid means, operable by a suitable liquid such as oil, or gas such as air under partial vacuum or positive pressure, to produce selective operation of speed ratio controlling elements or devices of the transmission by the primary selecting means. The primary means, when pressure fluid is employed, embodies valving means for selectively opening the pressure fluid to the transmission speed ratio controlling devices while the secondary controlling means embodies further valving means to divert the pressure fluid to another transmission speed ratio controlling device under desired conditions. The secondary valving means may be operable in response to engine throttle opening either by connection with the throttle adjusting mechanism or by utilizing the pronounced variation in the degree of partial vacuum which occurs in the engine intake system when the throttle is opened a relatively great amount. When the secondary valving is connected with the throttle adjusting mechanism, I preferably provide for operation of the secondary valving in response to movement of the throttle actuator or accelerator pedal beyond its fully opened throttle setting, the throttle actuator having an over-travel for this purpose.

In either of the foregoing arrangements of control on the operation of the secondary valving means, the secondary valving means preferably produces a control on the transmission independently of the setting of the primary valving means.

In a transmission having more than two speed ratio changes, as for example a transmission providing low, intermediate or second, high or direct, and reverse, I preferably arrange my secondary control as a step-down gear ratio from the fastest drive to a slower gear ratio drive. In the foregoing example, the secondary control would be arranged by preference as a step-down from direct to second. If the top gear ratio is an overdrive then by preference my step-down control would provide the direct drive at will.

With my improved transmission control, the secondary control preferably operates only when the primary control is set for the condition from which the step-down is desired. Thus, for example, the secondary valving would be operable, at least to effect speed ratio change, only when the primary control is set for direct drive through the transmission and when the secondary control is operated the primary control need not be disturbed, thereby restoring the control to the primary control on release of the secondary control.

My transmission control is of advantage in rapidly and conveniently accelerating the vehicle, as when another car is to be passed on the road and when a lower gear ratio drive is desired, the transmission being restored for normal drive under control of the primary means when the demand for rapid acceleration is removed from the engine. Furthermore, if the vehicle encounters an upgrade it is not necessary for the primary control means to manipulate the transmission to a lower speed ratio since the secondary control will come into action by the operation of the throttle actuator in its movement of increasing the power delivered by the engine, the drive being restored to the primary control by partial release of the throttle actuator.

While the transmission gearing may be of any desired type, I preferably employ planetary gear trains since such gearing offers advantages of control by friction controlling devices on the gearing elements, the friction controlling devices being conveniently and smoothly applied by pressure fluid. The use of a fluid coupling between the engine and transmission is also of advantage in obtaining smooth speed ratio changes, as well as other known advantages, although I do not limit my invention in its broader aspects to the use of planetary gearing or a fluid coupling.

An additional object of my invention is to provide an improved fluid valving means for transmissions whereby a change speed may be made only according to certain desired transmission driving conditions. I have provided such valving means in the form of leader and follower parts so arranged that the leader part effects controlling operation of the follower part to change the transmission drive only when the transmission is being operated in a predetermined setting by the primary control means. By reason of such arrangement the secondary control does not change the operation of the transmission by the primary control except under the desired conditions as when the transmission is being operated in one of its speeds such as the top speed.

I have also provided improvements in the secondary valving whereby the valving parts are very compactly arranged, assembly is facilitated, and the cost of manufacture is minimized.

Further objects and advantages of my invention will be more apparent as this specification progresses, reference being made to the accompanying drawings which illustrate several embodiments of the principles of my invention and wherein, Fig. 1 is a side elevational view somewhat diagrammatically illustrating my power transmission for a motor vehicle drive.

Fig. 2 is a detail sectional elevational view taken through a portion of the throttle actuating mechanism of Fig. 1.

Fig. 3 is a diagrammatic view illustrating the distributor valving means for the primary control.

Fig. 4 is a detail sectional view taken as indicated by line 4—4 of Fig. 3.

Fig. 7 is a sectional plan view taken as indicated by line 7—7 of Fig. 1 and illustrating the valving means for the secondary control.

Fig. 8 is a view generally similar to Fig. 7 but illustrating the valving in another position of operation.

Figure 5:
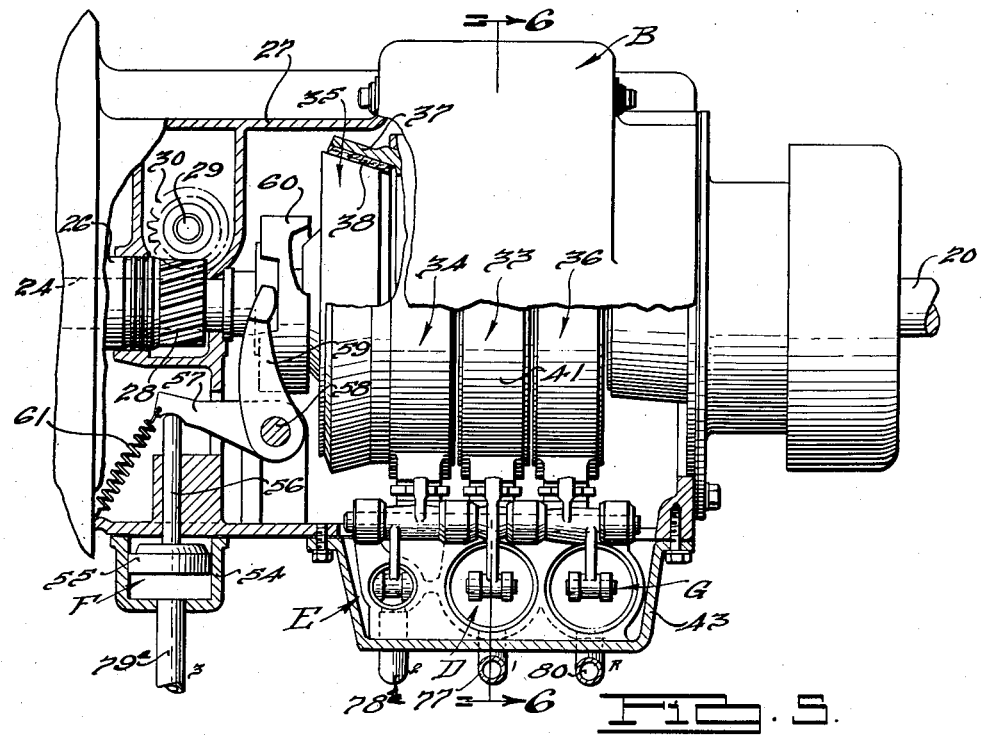
Fig. 5 is a sectional plan view of the transmission taken as indicated by line 5—5 of Fig. 1.

Figs. 9, 10, 11 and 12 are detail sectional views of the valve parts taken as indicated respectively by lines 9—9, 10—10, 11—11, and 12—12 of Fig. 7.

Fig. 13 is a further detail sectional view taken along line 13—13 of Fig. 8.

Fig. 14 is a sectional elevational view taken as indicated by line 14—14 of Fig. 8.

Fig. 15 is a view generally similar to Fig. 1 but illustrating a modified arrangement for the secondary control means.

Fig. 16 is a detail sectional plan view through the secondary valving of the Fig. 15 arrangement, the view being taken as indicated by line 16—16 of Fig. 15.

Fig. 17 is a view similar to Fig. 16 but illustrating another position of the valving parts.

Referring to the accompanying drawings, I have illustrated my invention in conjunction with a motor vehicle drive embodying a prime mover which transmits its power through a clutch and a speed ratio controlling transmission for transmitting the drive from the prime mover to the driving ground wheels of the motor vehicle, such parts being of any suitable type and construction. I have illustrated the prime mover as the usual internal combustion engine A for driving the vehicle through a transmission B preferably through the medium of a clutch C. By preference, the transmission B is preferably of a planetary gear type and the clutch C is illustrated as a fluid coupling. The transmission B has a power take-off driven shaft 20 which is operably connected to drive the ground wheels of the vehicle in any well known or suitable manner.

The engine A has a driving shaft 21 which drives the impeller 22 of the fluid coupling C, the runner 23 being secured to a shaft 24 which transmits the drive from the fluid coupling to the transmission B. The impeller and runner of the fluid coupling are provided with the usual vanes 25' which produce the desired circulation of the fluid medium from the impeller to the runner for transmitting the drive through the fluid coupling in a well known manner. The impeller 22 is suitably journalled to rotate freely around shaft 24 and is provided with a driving sleeve 26 which projects into the casing or housing 27 of transmission B. The driving sleeve 26 carries a gear 28 for driving a shaft 29 through a gear 30, the shaft 29 extending downwardly into the oil reservoir or sump 31 (see Fig. 3) for driving a pump which is diagrammatically represented at 32 and which may be of any suitable well known type.

Figure 6:
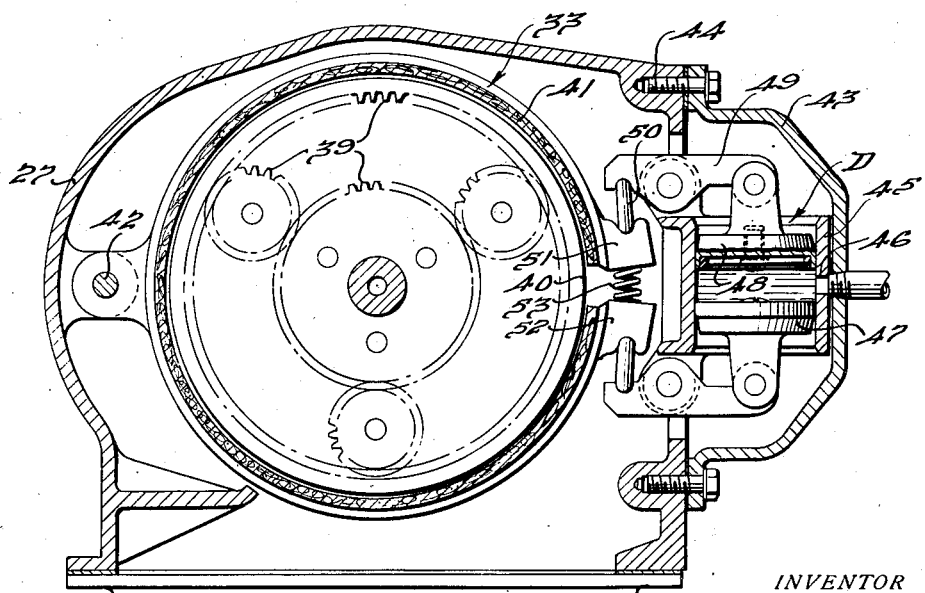
Fig. 6 is a sectional elevational view illustrating the first speed transmission controlling device and taken as indicated by line 6—6 of Fig. 5.

The transmission B comprises a plurality of speed ratio controlling devices respectively adapted for engagement with rotary control elements of the various planetary gear trains for effecting the various speed ratio drives through the transmission, operating means being provided for effecting operation of the speed ratio controlling devices. In my drawings I have illustrated a transmission having three forwardly driving speed ratios and a reverse drive, these driving speed ratios being selectively brought into operation by the speed ratio controlling devices 33, 34, 35 and 36 which respectively control the drives for first or low speed, second or intermediate speed, high or direct, and reverse. The controlling devices 33, 34 and 36 are illustrated in the form of frictional brake bands and the controlling device 35 is illustrated in the form of a friction cone clutch. The rotary control element 37 is provided with an inner lining of friction material 38 for engagement with the third speed controlling device 35 in order to effect the third speed or direct drive in accordance with customary practice for planetary transmissions. In Fig. 6 I have illustrated a typical planetary gear train, generally designated at 39, for the low speed drive and having associated therewith a rotary control element 40 which is in the form of a drum operatively connected with the planetary gear train 39, it being understood that the controlling devices 34 and 36 are likewise associated with a rotary control drum element.

The typical controlling device 33 comprises a brake band 41 anchored at 42 to the transmission housing 27, the band 41 being illustrated in its expanded position allowing the drum 40 to rotate freely. When it is desired to produce the low speed drive through the transmission, the band 41 is adapted to be contracted into engagement with drum 40 to arrest rotation thereof. In order to effect operation and release of the controlling device 33, I have provided fluid pressure operated means illustrated as a pressure fluid motor D, corresponding pressure fluid operated means E, F and G being provided to effect controlling operation of the aforesaid speed ratio controlling devices 34, 35 and 36, respectively.

The motors D, E and G are carried by a housing or casting 43 which is removably secured by fasteners 44 to the side of the transmission housing 27. The motor D which is typical of motors E and G comprises a cylinder 45 having a pressure fluid inlet 46 for supplying pressure fluid to the cylinder to force apart a pair of pistons 47 and 48 which are slidably mounted in cylinder 45. Each piston is pivotally connected to operate a lever 49 and these levers operate through a link 50 to force the ends 51 and 52 of the band 41 toward one another to contract the band for arresting rotation of drum 40. A spring 53 yieldingly urges the band ends 51 and 52 away from one another and the pistons 47 and 48 toward one another to effect release of the low speed when the supply of pressure fluid to the cylinder 45 is cut off, as will presently be more apparent.

The motor F for effecting operation of the third speed controlling device 35 comprises a cylinder 54 which receives a slidable piston 55 adapted to operate the piston rod 56 and lever 57 which is pivotally supported at 58. The lever 57 has a yoked extension 59 which operates a thrust collar 60 for slidably operating the cone 35 into frictional engagement with the friction material 38 of the rotary controlling element 37, a spring 61 being provided to restore the parts after operation. In Fig. 5, the transmission is illustrated as operating in the third speed drive, pressure fluid being introduced to the cylinder 54 to cause clutching of the controlling device 35 with the rotary control element 37.

In the operation of the transmission as thus far described, it will be apparent that by selectively introducing pressure fluid to the motors D, E, F and G, the transmission will provide drives in first, second, third and reverse, respectively.

I will now describe the primary selective control means for effecting selective operation of the speed ratio controlling devices 33 to 36 to vary the speed ratio drive through the transmission. This primary control comprises a pressure fluid circulating system between the aforesaid reservoir 31 and the motors D, E, F and G, the pressure fluid supply to these motors being controlled by a primary distributer valving means designated as H. This primary valving means comprises a casing 62 which houses the rotatable distributer valve 63 which has portions 64 and 65 thereof engaging the casing 62 in order to form high and low pressure chambers 66 and 67, respectively.

The high pressure chamber 66 is always in communication with a pressure fluid supply conduit 68 which communicates with the delivery of pump 32 and in order to prevent the pump from building up an excess pressure, beyond that which is required for the operation of the motors D to G, I have provided means for relieving such excess pressure by reason of a conduit 69 which opens at a check valve 70. This valve is yieldingly urged to its seat by a spring 71 adjustably loaded by the threaded abutment 72 so as to build up the desired pressure of fluid in the delivery pipe 68. When the valve 70 is unseated by excess pressure in conduit 68, the pressure is relieved through the conduit 69 and back to the reservoir 31 by means of a conduit 73 which communicates with the interior chamber of the relief valve casing 74.

The main valve body 63 is formed with a delivery portion 75 which engages the valve casing 62, the valve body being formed with a pressure fluid delivery conduit 76 which is always open to the high pressure chamber 66 at the intake end of conduit 76. The outlet end of conduit 76 extends within the valve portion 75 and is adapted to selectively register with the pipes or conduits 77, 78, 79 and 80 which respectively communicate with the pressure fluid cylinders of the aforesaid motors D, E, F and G. These distributer pipes at the casing 62 are arranged to lie in a common plane and between conduits 77 and 80 there is provided a space 81 for a neutral position of adjustment of the valve 63. Thus when the outlet end of distributer conduit 76 is registered with this space 81, then the transmission is in its neutral setting and there is no delivery of pressure fluid through any of the conduits 77 to 80.

A return conduit 82 is open at one end to the reservoir 31 and at the other end communicates with the low pressure chamber 67 at a point below the common plane of the pipes 77 to 80 so that regardless of the adjustment of the valve 63, the low pressure chamber 67 is always in communication with the return conduit 82. The valve 63 is rotatably adjusted through a valve stem 83 which extends laterally outwardly of the side wall 84 of the valve casing 62, the stem 83 being connected to a lever 85 which extends to the primary means for adjusting or controlling the primary valving means H.

The operation of the primary valving means H as thus far described, is as follows. In Figs. 3 and 4 it will be noted that the adjusting lever 85 is positioned for adjustment of the valve 63 so that the pressure fluid delivery conduit 76 is registered with the third speed conduit 79. Under such conditions, the pump 32 will supply pressure fluid through the conduit 68 to the high pressure chamber 66 for delivery of the pressure fluid through the conduit 76 and distributer pipe 79 which leads to the third speed motor F for effecting operation of the third speed ratio controlling device 35 for obtaining a direct drive through the transmission B. At this time the remaining distributer conduits 77, 78 and 80 which respectively lead to the first, second and reverse motors D, E and G, are open to the low pressure chamber 67 and therefore communicate with the return conduit 82 leading to the reservoir 31 for relieving any pressure previously established in these motors. When the lever 85 is operated to rotatably adjust the valve 63 to another of its positions of transmission control by the primary operating means which will be presently described, the conduit 76 is accordingly registered with one of the distributer conduits 77, 78 and 80 for obtaining whatever driving speed ratio is called for by the primary operating means and when the conduit 76 is positioned to communicate with the space 81 then at such time the transmission is adjusted for its neutral setting.

I will now describe the primary operating means for effecting selective adjustment of the primary distributer valving means H. In the present embodiment of my invention I have illustrated this primary operating means as a manual control operable by the vehicle driver at some convenient point. Referring to Fig. 1, the usual steering wheel 86 is mounted on the customary steering post 87, to which is fixed a bracket 88 carrying a segment 89 on which is mounted a manually operable selector element or lever 90 adapted to swing on a pivot 91. The segment 89 is formed with a plurality of arcuately spaced notches which define stations or positions of transmission control for assisting the operator in the selective adjustment of lever 90 for changing the setting of the transmission. Thus, the segment 89 is formed with stations 92 to 96 which respectively correspond to transmission settings for first, second, third, reverse and neutral.

The inner end of selector element 90 is connected at 97 to a Bowden wire mechanism 98 which has its other end connected at 99 to the aforesaid lever 85 so that selective adjustment of lever 90 will produce a corresponding adjustment of the valve 63.

I will now describe my secondary control means for effecting variation in the transmission drive operable in response to driver manipulation of engine power variation. This secondary control means comprises a secondary valving means J preferably located between the primary valving means H and the pressure fluid operated means or motors which are to be controlled by the secondary control system; also a manually operable control for the secondary valving means J operable independently of the manual control for the primary system.

In Fig. 1 I have illustrated the manually operable control for the secondary valving means J in the form of a mechanical operating connection between the engine throttle valve adjusting mechanism and the secondary valving means. The usual accelerator pedal 100 is pivotally supported at 101 to the toe-board 102 of the motor vehicle body, a spring 103 yieldingly urging the accelerator pedal to its position of release at which time the engine A will have its throttle valve adjusted for engine idling. The engine A has the usual intake manifold 104 for the distribution of the usual gasoline and air mixture to the operating cylinders of the engine, the manifold being supplied with the charge by a carburetor 105 which communicates through a riser 106 with the intake manifold. The usual throttle valve for adjusting the quantity of fuel mixture supply is indicated at 107 in the idling position. A pin 108 limits the opening movement of valve 107 at its wide open throttle position of adjustment by a lever 109 which is connected to the throttle valve 107. The lower end of lever 109 is pivotally secured at 110 to the member 111 (see Fig. 2) which has an internal bore 112 slidably receiving the forward end 113 of a rod 114, the rear end of which is pivoted at 115 to a link 116 which has pivotal connection at 117 to the accelerator pedal 100.

Pinned to the rod 114 at 118 is a collar 119 and surrounding rod 114 between collar 119 and member 111 is a relatively stiff coil spring 120 which normally serves to provide an operating connection between rod 114 and member 111. In order to limit separation of collar 119 and member 111, there is provided a bracket 121 which has an end portion 122 engaging the pivot 110 and a second end portion 123 which engages the rear face of collar 119 and which loosely receives rod 114.

The toe-board 102 carries a downwardly extending bracket 124 carrying a pin or shaft 125 on which is loosely journalled a swinging guide link 126 having its lower end pivoted at the aforesaid point 115 to the link 116 and rod 114.

As thus far described, it will be apparent that when the accelerator pedal 100 is depressed by the foot of the driver, link 116 will be thrust forwardly to operate through rod 114, spring 120, member 111, and lever 109 to rotatably adjust the throttle valve 107 to its open position to supply increasing quantities of fuel and air mixture to the engine A and thereby increase the power delivery of the engine. At such times the relatively stiff spring 120 operates as a positive connection between rod 114 and member 111 so that there is no lost motion between rod 114 and throttle valve 107 during the normal adjustments of throttle valve 107 by the accelerator pedal 100. When the operator releases the pedal 100, it will be understood that the spring 103 serves to return the accelerator pedal as aforesaid.

The secondary valving means J is adapted for operation by an overtravel of the accelerator pedal 100 beyond its depressed position corresponding to wide open throttle adjustment of valve 107. This additional movement of the accelerator pedal beyond the point where the throttle valve 107 engages the pin 108 to prevent further movement thereof, is accommodated by the spring 120 which yields to permit forward movement of rod 114 by reason of the end 113 thereof sliding in the bore 112 of member 111 while this member remains fixed against forward movement.

When the accelerator pedal 100 is depressed to the position corresponding to wide open throttle by causing the valve 107 to engage pin 108, a laterally projecting finger portion 127 of the link 126 at this time engages a further link 128 which is also loosely pivoted on the pin 125 for swinging movement independently of the link 126. The link 128 is yieldingly urged to a return position illustrated in Fig. 1 by a tension coiled spring 129 which has its ends connected to the toe-board 102 and the link 128 respectively. The spring 129 exerts a relatively great load on the link 128 so that the operator will not unintentionally depress the accelerator 100 beyond its wide open throttle position. I therefore preferably arrange the spring 129 so that a very decided additional load is thrown on the accelerator pedal 100, thereby requiring a marked resistance to movement of the accelerator pedal beyond its wide open throttle position. While a stop may be provided for the link 128 to limit its swinging movement toward the toe-board 102 by the spring 129 to the position of the link illustrated in Fig. 1, a stop at this point is not necessary inasmuch as this return movement of link 128 is limited by the arrangement of parts at the secondary valving means J as will be presently apparent.

The lower end of link 128 is connected at 130 to a second Bowden wire mechanism 131 which extends to a point of control on the secondary valving means J which is best illustrated in Figs. 7 to 14.

The secondary valving means is positioned in the line of pressure fluid delivery through the conduits 78 and 79 which respectively communicate with the second and third speed motors E and F. For convenience of reference, I have designated those portions of the conduits which extend between the primary valving means H and the secondary valving means J as primary 78 and 79 while those portions of the conduits which extend between the secondary valving means and the aforesaid motors are respectively designated as secondary 78ᵃ and 79ᵃ. The secondary valving means comprises a main casting 132 which is secured to the bottom portion of the transmission casing 27 and which is formed with a forwardly opening bore 133 closed by a cap 134 on which is mounted a bracket 135 carrying a pivotal support pin 136 for a lever 137. This lever has an outwardly extending arm 138 connected to the aforesaid Bowden wire 131 and a second arm 139 formed with an inwardly extending yoke 140.

The casting 132 is formed with axially aligned pressure fluid passages or conduits 141 and 142 which respectively communicate with the second speed pressure fluid delivery conduits 78 and 78ª, the casting having a further pair of axially aligned passages 143 and 144 which respectively communicate with the third speed conduits 79 and 79ª. These conduits open into the bore 133 although the axes of the pairs of aligned conduits 141, 142 and 143, 144 are offset slightly above the axis of bore 133 as best illustrated in Fig. 14.

Pressed into the bore 133 against relative movement with respect to casting 132 is a ported sleeve preferably formed in two parts 145 and 146 for convenience of manufacture, ends of these sleeve parts being brought closely together at 147 so that in effect the sleeve structure operates as a unitary part. The sleeve 145 is formed with an internal cylindrical bore 148 while the sleeve part 146 is formed with a corresponding bore 149 of somewhat larger diameter than that of the bore 148. The secondary valving means preferably comprises leader and follower valves 150 and 151 respectively mounted for relative sliding movement in the sleeve bores 149 and 148.

The follower valve 151 is formed with a reduced inner stem 152, annular pressure fluid conducting grooves 153 and 154, and the sleeve engaging portions 155, 156 and 157. The valve portion 155 serves as an abutment for a spring 158 which surrounds the stem 152, the other end of the spring acting against the casting 132 at the end 159 of the bore 133 so that the valve 151 is yieldingly urged outwardly in the sleeve 145 to the limit of its travel in the position illustrated in Fig. 7, at which time the outer end of the valve at the valve portion 157 strikes an abutment plug 160 which is threaded into the outer end of the sleeve part 145. The plug 160 is formed with a groove 161 which receives a ring of fluid sealing material 162 which is compressed against a shoulder 163 formed on the sleeve 145 and the head 164 of the abutment plug 160. This head 164 in turn serves to limit movement inwardly of the leader valve 150 as will presently be more apparent.

The sleeve 145 as best shown in Fig. 10, is formed with an arcuate port or recess 165 which communicates with the second speed passage 141, the recess 165 communicating with the sleeve bore 148 by a radial passage 166 which is offset inwardly from the axis of passage 141 as best shown in Fig. 7. Sleeve 145 is provided with a further arcuate port or recess 167 which is diametrically opposite the recess 165 and which communicates with passage 142. A radially extending passage 168 is likewise offset from the axis of passage 142 and is disposed at the outer end of recess 167 for establishing communication between the latter recess and the sleeve bore 148. The valving means according to the illustration in Fig. 7, corresponds to the transmission setting of Fig. 1 wherein the selector element 90 is set for a third speed drive of the transmission by engagement with the third speed notch or station 94 with the segment 89. In Fig. 7 the fluid pressure lines 78 and 78ª are in communication through the follower valve 151, but since said pressure fluid is not being delivered to the conduit 78 the second speed motor E will not be operated. The conduit 78 communicates with conduit 78ª with the parts positioned as in Fig. 7 through the recess 165, passage 166 thence by reason of the sleeve bore 148, through passage 168 and recess 167 to the passage 142.

The sleeve 145 has a further pair of diametrically opposite arcuate ports or recesses 169 and 170, respectively communicating with the passages 143 and 144; also a pair of radially extending passages 171 and 172 which respectively establish communication between recesses 169, 170 and the sleeve bore 148. The passage 171 is offset from the axis of passage 143 and is disposed at the inner end of the arcuate recess 169 while the passage 172 is likewise offset inwardly from the axis of passage 144 and is disposed at the inner end of the arcuate recess 170. With the parts positioned as in Fig. 7, the passage 143 is open to the passage 144 by reason of arcuate recess 169, passage 171, annular groove 153, passage 172, and arcuate recess 170. When the follower valve 151 is moved inwardly against the action of spring 158 to occupy its other position of operation as illustrated in Fig. 8, the valve portion 155 moves inwardly to the other side of the passage 168 thereby closing off communication between pressure fluid supply passage 141 and the passage 142. At the same time valve portion 156 likewise moves inwardly to the other side of passage 172 so that delivery of pressure fluid from passage 143 to the passage 144 is closed off. However, movement of the follower valve 151 from the Fig. 7 position to the Fig. 8 position is adapted to establish communication between the pressure fluid supply passage 143 and the second speed passage 142 as follows. Under such conditions the pressure fluid in passage 143 enters the arcuate recess 169, then passes through the passage 171, annular groove 153, passage 168, thence through arcuate recess 167 to the second speed passage 142 and thence to the second speed conduit 78ª for operating the second speed motor E. Therefore, when the pressure fluid is supplied to the third speed conduit 79 with the secondary valving J positioned as in Fig. 7, the third speed controlling device 35 is operated and under such conditions and assuming that the follower valve 151 is moved from the Fig. 7 position to the Fig. 8 position, the pressure fluid in the conduit 79 is thereby diverted from the third speed controlling device 35 to the second speed controlling device 34 to effect a change of a step-down character independently of selective adjustment of the primary selective control means.

The leader valve 150 is formed with an axial bore 173 and within this bore is positioned a rod 174 of sufficiently smaller diameter to provide a clearance space with bore 173, the purpose of which will be presently apparent. The inner end of rod 174 is formed with a head 175 which engages the inner end of the leader valve 150 so that when rod 174 is moved outwardly the leader valve 150 will likewise be moved with rod 174. The head 175 is formed with a passage 176 which provides communication between the space 177 and the clearance between rod 174 and the bore 173, the space 177 being that part of the sleeve bore 149 which lies between the inner end of leader valve 150 and the abutment plug 160. The valve 150 has an outer stem 178 around which is disposed a compression coil spring 179 which acts at 180 at the cap 134, the other end of the spring thrusting on the enlarged valve portion 181 slidably engaging the sleeve bore 149.

The valve 150 has the further enlarged portions 182 and 183 which slidably engage the sleeve bore 149, the valve having the annular grooves 184 and 185 which provide pressure fluid passageways during operation of said valve. The sleeve part 146, as best seen in Fig. 13, is formed with the arcuate recesses 186 and 187 respectively opening inwardly to the sleeve bore 149 by reason of the radial passages 188 and 189 which are relatively offset axially of the sleeve 146. The recess 186 is in continuous communication with a passage 190, this passage being open at its other end with the third speed pressure fluid passage 143. The recess 187 is axially elongated so that it extends inwardly to form a continuous pressure fluid conduit with a passage 191 formed in the sleeve 145, the passage 191 communicating through a radial passage 192 with the sleeve space 193 between the valve 151 and the abutment plug 160. The outer end of rod 174 carries a head 194 against which the yoke 140 operates whereby the lever 137 is adapted to move the leader valve 150 outwardly against the resistance offered by the spring 179, the latter spring with the parts positioned as in Fig. 7 causing the valve 150 to maintain a position in engagement with the rod head 175 which in turn has its inward movement limited by engagement with the abutment plug 160. Outward movement of rod 174 under the influence of Bowden wire 131 is limited, as in the Fig. 8 position of valve 150, by reason of the stem 178 engaging the portion 180 of the cap 134. These abutments which define the extreme limits of travel of the valve 150 therefore likewise limit the extreme movements of swing of the aforesaid link 128 under the influence of the spring 129 and the finger 127 actuated by depressing the accelerator pedal 100.

With the leader valve 150 positioned as in Fig. 7 for a normal drive in third speed through the transmission B, it will be apparent that the pressure fluid in passage 143 enters the passage 190 and thence through recess 186 and passage 188 but further passage of the pressure fluid does not take place because the pressure fluid is trapped between the valve portions 182 and 183. When the accelerator pedal 100 is depressed beyond the wide open throttle position to produce an overtravel, the finger 127 picks up the link 128 and operates through the Bowden wire mechanism 131 and lever 137 to move the leader valve 150 outwardly from the Fig. 7 position thereof to the Fig. 8 position. This movement of the leader valve establishes communication between the pressure fluid passage 190 and the recess 187 since now the passages 188 and 189 are both in communication with the annular groove 185. This produces a supply of pressure fluid through the recesses 187 and 191, thence through the passage 192 into the space 193 to produce inward movement of the follower valve 151 from the Fig. 7 position to the Fig. 8 position and thereby cause the pressure fluid from conduit 79 to be diverted from the conduit 79ᵃ to the conduit 78ᵃ whereby the third speed motor F is released and the second speed motor E is operated to produce a step-down in the driving speed ratio of the transmission B. Immediately on release of the overtravel of accelerator pedal 100 to the wide open throttle position or to any point of further release, spring 129 will serve to restore link 128 and the Bowden wire mechanism 131 to the Fig. 1 position of these parts and the spring 179 will likewise restore the leader valve 150 back to the Fig. 7 position and thereby cut off the pressure fluid supply between passages 190 and 187. Thereupon the spring 158 operates to produce outward movement of the follower valve 151 thereby restoring this valve to the Fig. 7 position whereupon the second speed motor E is released and the third speed motor F is again operated to change the transmission setting from second to high, it being noted that the selector element 90 is not disturbed during the step-down and step-up operation of the secondary control means by manipulation of the accelerator pedal 100. In the event that the accelerator pedal 100 is depressed through its overtravel at any time when the selector element 90 is not set in the third speed position, such movement of the accelerator pedal will not produce any change in the speed ratio setting of the transmission B by reason of the fact that the passage 143 is supplied with pressure fluid only when the primary valving means H is adjusted for direct drive or third speed by a corresponding setting of the selector element 90.

It will be noted that the arcuate recesses in the sleeve parts 145 and 146 do not extend all of the way around the sleeve and by reason of my construction it is not necessary to offset the pairs of passages 141, 142 and 143, 144 in a direction axially of the sleeve. This arrangement of arcuate recesses minimizes the length of the sleeve and the length of the valving as a whole. My invention has, among its advantages, the provision of a valving mechanism which is very compact, and which may be conveniently assembled and manufactured at relatively low cost. By separating the sleeve parts 145 and 146 at the juncture 147, assembly of the abutment plug 160 is facilitated and the cost of manufacture of the sleeve as a whole is minimized.

I have also provided a system of venting the various passages and valving chambers so that the leader and follower valves 150 and 151 respectively will move quickly and freely. With the parts positioned as in Fig. 7, when the pressure fluid is supplied from passage 143 to passage 144, the second speed motor E is drained back through the passage 142 and passage 141 thence through conduit 78, low pressure chamber 67 of the primary valving means H, and back to the reservoir 31 by reason of the return conduit 82. When the leader valve 150 is moved outwardly to the Fig. 8 position, there is no tendency to create a vacuum in the space 177 because the passage 176 is open to the passage 195 through the space between rod 174 and valve bore 173, thereby causing a displacement of fluid from space 195 freely into the space 177. Similarly when the valve 150 moves inwardly the fluid in space 177 is freely displaced back to the space 195.

Referring to Fig. 12 I have provided a bleed or vent pipe 196 which projects upwardly and is open at the top to the oil storage reservoir of the transmission B, the lower end of the pipe 196 communicating with the annular groove 184 of the leader valve 150 when this valve is positioned as in Fig. 7 and also in Fig. 8. Inasmuch as the leader valve must move from the Fig. 8 position to the Fig. 7 position before the follower valve 151 can move from its Fig. 8 position to its Fig. 7 position, it will be observed that the passage 189 is open to the annular groove 184, as in Fig. 7, thereby venting the space 193 by way of the recesses 191 and 187 to facilitate the return movement of the leader valve 151 by displacing the fluid from space 193 into the upright pipe 196. The pipe 196 is carried for a small distance upwardly into the reservoir of the transmission in order to prevent any sediment which might collect in the reservoir from entering the pipe 196 and which might cause trouble in the operation of the secondary valving J. As soon as the primary valve 150 is moved outwardly the passage 189 is closed from communication with vent pipe 196 by reason of the valve portion 182 being moved across passage 189 or from the Fig. 7 to the Fig. 8 position.

As best seen in Fig. 9, wherein a portion of the sleeve 145 and casting 132 are cut away from the illustrated section, a second vent pipe 197, similar to the pipe 196, is provided and which is in continuous communication with the annular groove 154 of the follower valve 151 in each of its positions of Fig. 7 and Fig. 8. In the Fig. 7 position communication between pipe 197 and valve groove 154 merely establishes communication between the transmission reservoir and this annular groove 154 but when the follower valve 151 is moved inwardly to the Fig. 8 position by reason of pressure fluid being introduced to the space 193, then the pressure fluid in passage 144 is vented through the pipe 197 through the recess 170, passage 172, and annular groove 154 so that the third speed motor F may be quickly released by action of the spring 61 moving the piston 55 outwardly to cause the fluid in cylinder 54 to be readily displaced through the pipe 197 and thence to the transmission reservoir. As soon as the follower valve 151 is moved by the spring 158 from the Fig. 8 position to the Fig. 7 position, the valve portion 156 moves across the passage 172 to close off communication between this passage and the pipe 197.

When the valve 151 is in the Fig. 7 position it will be noted that the second speed motor E is vented by communication of passage 142 with passage 141, conduits 78, low pressure chamber 67 and return 82 to the reservoir 31. As soon as valve 151 is moved inwardly by the introduction of pressure fluid at space 193, valve portion 155 moves across the passage 168 thereby closing off communication between passage 168 and passage 166 because at such time the pressure fluid in passage 143 is to be diverted to the passage 142 leading to the second speed motor E. While in Figs. 7 and 8 the pipes 196 and 197 cannot be seen because the section is taken looking downwardly, I have illustrated these pipes in construction lines in order to illustrate their relative positions with respect to the leader and follower valves, it being understood that these pipes project upwardly from the sections taken in Figs. 7 and 8 and as will be apparent from Figs. 9 and 12.

While the space 177 is vented to the space 195, by the clearance around rod 174 as aforesaid, a further vent is illustrated for space 177 either to supplement the aforesaid vent or as a substitute therefor. This further vent comprises a system of passages which continuously establishes communication between space 177 and pipe 196. Referring to Figs. 12 to 14, sleeve 146 has a groove 177ᵃ along the upper portion continuously open at its ends respectively with pipe and radial passage 177ᵇ which leads into space 177. The groove 177ᵃ is thus open to annular groove 184 when valve 150 is positioned as in Fig. 7 as well as in Fig. 8.

Summarizing the operation of the power transmission, it will be noted that the various speed ratio changes and neutral may be produced in the setting of the transmission B by manipulation of the selector element 90 into any of its stations of transmission control 92 to 96. This selective adjustment of the selector element 90 causes a corresponding setting of the primary valving means H which selectively supplies pressure fluid from the pump 32 to the motors D to G causing a corresponding selective operation in the 5 speed ratio controlling devices 33—36. At any time when the primary control means is operating to cause a third speed or direct drive in the transmission B, manual depression of the accelerator pedal 100 beyond the wide open throttle position thereof will produce an overtravel of the accelerator pedal and thereby act on the secondary valving means to cause the leader valve 150 to introduce pressure fluid from the third speed conduit 79 to move the follower valve 151 inwardly and thereby divert the pressure fluid from the third speed line 79 to the second speed passage 142 and thence through the second speed conduit 78ᵃ to operate the second speed controlling device 34, the direct speed controlling device 35 being simultaneously released. Upon release of the accelerator pedal 100 from the overtravel condition, the leader valve 150 will be restored thereby cutting off the supply of pressure fluid to the follower valve 151, and this follower valve will then be restored to cut off the supply of pressure fluid to the second speed controlling device 34 and to cause operation of the direct speed controlling device 35 to restore the transmission to the direct drive condition. Obviously the secondary controlling means may be operated by any suitable mechanism other than the accelerator pedal 100, but the use of the accelerator pedal is preferred because the depression of the accelerator pedal is a natural movement by the operator, herein designated as a manual operation, so that when the engine A is called upon to increase its power output as in climbing a hill or passing another vehicle at a faster speed than would be provided by the use of the top drive, the operator has only to depress the accelerator pedal without varying the setting of the primary control means at the selector element 90, the primary control means being left so that the setting thereof will be automatically restored upon release of the secondary control means.

Referring now to Figs. 15, 16 and 17, I have illustrated a modified arrangement of control of the secondary valving means J' wherein, while the secondary valving means is still operated in response to adjustment of the throttle valve operating mechanism as in the Fig. 1 embodiment, I have utilized the inherent property of variation in the partial vacuum created in the intake manifold of the engine for causing operation of the secondary valving means. In this modified arrangement, the primary control means for the transmission is identical with that aforesaid and therefore need not be further described in detail. Furthermore, the secondary valving means is, for the most part, similar to that described in connection with Figs. 7 and 8 and I have therefore given corresponding parts reference numerals similar to those previously employed, it being understood that the secondary valving means J' is identical in function and operation with respect to the secondary valving means J, except as will be noted as follows.

In Fig. 17 the abutment plug 160ᵃ is secured between the sleeve parts 145ᵃ and 146ᵃ by bringing the adjacent ends of these sleeve parts toward one another and into engagement with an annular shoulder 198 carried by the abutment plug 160ᵃ. It will also be noted that in place of the vent pipe 197, I have illustrated a corresponding vent at 199 which communicates with the annular groove 154 through the sleeve recess 200 and the passage 201.

The primary valve 150ᵃ has a stem 178ᵃ formed with a pair of detents in the form of annular grooves 202 and 203 selectively engageable by a ball 204 yieldingly urged inwardly by an adjustable spring 205 whereby to yieldingly restrain the leader valve 150ᵃ from fluctuating between its two positions of control and to fix the leader valve in the several positions of its movement. A spring 179ᵃ yieldingly urges movement of the leader valve inwardly from the Fig. 16 to the Fig. 17 position, and the chamber 195ᵃ is now placed in communication through an opening 206 and a pipe 207 with the intake manifold 104 of the engine A. Any suitable means may be provided for venting the space 177ᵃ to facilitate movement of leader valve 150ᵃ in the event that it is desired to increase the movement of the leader valve in comparison with its movement without any venting other than a certain amount of leakage which will ordinarily occur between said valve and the sleeve 146ᵃ.

In Fig. 15 the accelerator pedal 100 is now directly connected through a link 208 with the throttle valve actuating lever 109ᵃ, it being noted that this arrangement does not depend on an overtravel of the accelerator pedal for producing an operation of the secondary valving means J'. During normal operation of the motor vehicle in the third speed or direct drive as obtained by a setting of the aforesaid primary control means with the selector element 90 positioned as in Fig. 1, the secondary valving J' will be positioned as in Fig. 16 with the pressure fluid being supplied to the third speed controlling device 35. At this time the partial vacuum in the intake manifold 104 will act in the chamber 195 to maintain the leader valve 150ᵃ in its outer position compressing the spring 179ᵃ. However, should the operator depress the accelerator pedal 100 beyond some point determined by the power of spring 179ᵃ the force of the spring pressed ball 204, and the capacity of chamber 195ᵃ, the degree of partial vacuum will be reduced and the spring 179ᵃ will then act to move the leader valve 150ᵃ inwardly from the Fig. 16 position to the Fig. 17 position whereupon, as before, the pressure fluid will move the follower valve 151ᵃ inwardly to divert the pressure fluid from the third speed controlling device 35 and cause operation of the second speed controlling device 34. The leader valve 150ᵃ will be restored to the Fig. 16 position to again obtain a direct drive by a partial release of the accelerator pedal 100 or such increase in the speed of engine A as will again increase the degree of partial vacuum in the intake manifold 104, or a combination of these two circumstances, so that the step-down and step-up operation of the secondary controlling means will be produced by manipulation of the accelerator pedal independently of manipulation of the primary control means from the direct drive setting.

It will be apparent in the Fig. 1 or Fig. 15 embodiments of my invention, I have provided what may be termed a kick-down control on the transmission; a control which may be conveniently and quickly operated without requiring the driver to divert his attention and without requiring any control by the driver other than the natural function of manipulating the accelerator pedal.

I do not limit my invention, in the broader aspects thereof, to any particular combination and arrangement of parts such as shown and described for illustrative purposes since various modifications will be apparent from the teachings of my invention and scope thereof as defined in the appended claims.

What I claim is:

1. In a power transmission for motor vehicles, a plurality of speed ratio controlling devices adapted to control selective forward speed ratio drives through the transmission, a plurality of pressure fluid operated motors respectively adapted to control operation of said devices, primary control means adapted for manipulation by the vehicle driver for effecting selective variation of said transmission drives and including primary valving means selectively operable at the will of the driver to control pressure fluid application to said motors, and secondary valving means operable at the will of the vehicle driver to change the application of pressure fluid from one of said motors to another of said motors independently of selective operation of said primary valving means.

2. In a power transmission for motor vehicles, a plurality of speed ratio controlling devices adapted to control selective speed ratio drives through the transmission, one of said drives being faster than another, a plurality of pressure fluid operated motors respectively adapted to control operation of said devices, primary control means for effecting selective variation of said transmission drives and including primary valving means selectively operable at the will of the vehicle driver to control pressure fluid application to said motors, and secondary valving means operable independently of selective operation of said primary valving means and when the latter has been operated to provide said faster speed ratio drive for varying the application of pressure fluid to at least one of said motors to effect a change in the transmission drive.

3. In a power transmission for motor vehicles; a plurality of speed ratio controlling devices adapted to control selective speed ratio drives through the transmission; a pressure fluid operated motor for controlling operation of each of said devices; primary control means for effecting selective variation of said drives, including, primary valving means selectively operable to control pressure fluid application to said motors, a plurality of pressure fluid-supplying conduit means respectively communicating at the ends thereof with said motors and said primary valving means; and secondary valving means interposed in said conduit means for diverting pressure fluid supply from one of said conduit means to the other so that the pressure fluid is conducted through portions of both of the last said conduit means.

4. In a power transmission for motor vehicles; a plurality of speed ratio controlling devices adapted to control selective speed ratio drives through the transmission; a pressure fluid operated motor for controlling operation of each of said devices; primary control means for effecting selective variation of said drives, including, primary valving means selectively operable to control pressure fluid application to said motors, a plurality of pressure fluid-supplying conduit means respectively communicating with said motors and said primary valving means; and secondary valving means interposed in said conduit means for shunting the pressure fluid from one of said conduit means to another of said conduit means so that the pressure fluid is conducted through portions of both of the last said conduit means for effecting a change in the transmission drive.

5. In a power transmission for motor vehicles, a speed ratio controlling device adapted to control a speed ratio drive through the transmission, a second speed ratio controlling device adapted to control another speed ratio drive through the transmission relatively slower than the first said drive, fluid pressure operated means for controlling operation of the first said device, second fluid pressure operated means for controlling operation of the second said device, a high speed secondary pressure fluid supply conduit for the first said device, a low speed secondary pressure fluid supply conduit for the second said device, a high speed primary pressure fluid supply conduit for said high speed secondary conduit, a low speed primary pressure fluid supply conduit for said low speed secondary conduit, primary valving means for controlling supply of pressure fluid to said primary conduits, and secondary valving means for controlling supply of pressure fluid between said primary and secondary conduits.

6. In a power transmission for motor vehicles, a speed ratio controlling device adapted to control a speed ratio drive through the transmission, a second speed ratio controlling device adapted to control another speed ratio drive through the transmission relatively slower than the first said drive, fluid pressure operated means for controlling operation of the first said device, second fluid pressure operated means for controlling operation of the second said device, a high speed secondary pressure fluid supply conduit for the first said device, a low speed secondary pressure fluid supply conduit for the second said device, a high speed primary pressure fluid supply conduit for said high speed secondary conduit, a low speed primary pressure fluid supply conduit for said low speed secondary conduit, primary valving means for controlling supply of pressure fluid to said primary conduits, and secondary valving means for controlling supply of pressure fluid from said high speed primary conduit to said high speed secondary conduit and from said low speed primary conduit to said low speed secondary conduit.

7. In a power transmission for motor vehicles, a speed ratio controlling device adapted to control a speed ratio drive through the transmission, a second speed ratio controlling device adapted to control another speed ratio drive through the transmission relatively slower than the first said drive, fluid pressure operated means for controlling operation of the first said device, second fluid pressure operated means for controlling operation of the second said device, a high speed secondary pressure fluid supply conduit for the first said device, a low speed secondary pressure fluid supply conduit for the second said device, a high speed primary pressure fluid supply conduit for said high speed secondary conduit, a low speed primary pressure fluid supply conduit for said low speed secondary conduit, primary valving means for controlling supply of pressure fluid to said primary conduits, and secondary valving means providing supply of pressure fluid from said high speed primary conduit to said high speed secondary conduit and from said low speed primary conduit to said low speed secondary conduit, said valving means being operable to shunt the pressure fluid supply from said high speed primary conduit to said low speed secondary conduit, said valving means operating to vent said high speed secondary conduit when said pressure fluid is shunted as aforesaid.

8. In a power transmission for motor vehicles, a speed ratio controlling device adapted to control a speed ratio drive through the transmission, a second speed ratio controlling device adapted to control another speed ratio drive through the transmission relatively slower than the first said drive, fluid pressure operated means for controlling operation of the first said device, second fluid pressure operated means for controlling operation of the second said device, a high speed secondary pressure fluid supply conduit for the first said device, a low speed secondary pressure fluid supply conduit for the second said device, a high speed primary pressure fluid supply conduit for said high speed secondary conduit, a low speed primary pressure fluid supply conduit for said low speed secondary conduit, primary valving means operable to selectively control supply of pressure fluid to said primary conduits, and secondary valving means normally providing communication between said high speed primary and secondary conduits and between said low speed primary and secondary conduits, and means effecting operation of said secondary valving means to close the communication between said high speed primary and secondary conduits and to provide communication between said high speed primary conduit and said low speed secondary conduit.

9. In a power transmission for motor vehicles, a speed ratio controlling device adapted to control a speed ratio drive through the transmission, a second speed ratio controlling device adapted to control another speed ratio drive through the transmission relatively slower than the first said drive, fluid pressure operated means for controlling operation of the first said device, second fluid pressure operated means for controlling operation of the second said device, a high speed secondary pressure fluid supply conduit for the first said device, a low speed secondary pressure fluid supply conduit for the second said device, a high speed primary pressure fluid supply conduit for said high speed secondary conduit, a low speed primary pressure fluid supply conduit for said low speed secondary conduit, primary valving means operable to selectively control supply of pressure fluid to said primary conduits, and secondary valving means normally providing communication between said high speed primary and secondary conduits and between said low speed primary and secondary conduits, and means for utilizing the pressure fluid in said high speed primary conduit for effecting operation of said secondary valving means to close the communication between said high speed primary and secondary conduits and to provide communication between said high speed primary conduit and said low speed secondary conduit.

10. In a power transmission for motor vehicles, a speed ratio controlling device adapted to control a speed ratio drive through the transmission, a second speed ratio controlling device adapted to control another speed ratio drive through the transmission relatively slower than the first said drive, fluid pressure operated means for controlling operation of the first said device, second fluid pressure operated means for controlling operation of the second said device, a high speed secondary pressure fluid supply conduit for the first said device, a low speed secondary pressure fluid supply conduit for the second said device, a high speed primary pressure fluid supply conduit for said high speed secondary conduit, a low speed primary pressure fluid supply conduit for said low speed secondary conduit, primary valving means operable to selectively control supply of pressure fluid to said primary conduits, follower valving means operable to a first position thereof to provide communication between said high speed primary and secondary conduits and between said low speed primary and secondary conduits, leader valving means, and means for operating said leader valving means from a first position thereof to a second position to cause pressure fluid operation of said follower valving means to a second position thereof thereby to close communication between said high speed primary and secondary conduits and to provide communication between said high speed primary conduit and said low speed secondary conduit.

11. In a power transmission for motor vehicles, a speed ratio controlling device adapted to control a speed ratio drive through the transmission, a second speed ratio controlling device adapted to control another speed ratio drive through the transmission relatively slower than the first said drive, fluid pressure operated means for controlling operation of the first said device, second fluid pressure operated means for controlling operation of the second said device, a high speed secondary pressure fluid supply conduit for the first said device, a low speed secondary pressure fluid supply conduit for the second said device, a high speed primary pressure fluid supply conduit for said high speed secondary conduit, a low speed primary pressure fluid supply conduit for said low speed secondary conduit, primary valving means operable to selectively control supply of pressure fluid to said primary conduits, follower valving means operable to a first position thereof to provide communication between said high speed primary and secondary conduits and between said low speed primary and secondary conduits, leader valving means, means for operating said leader valving means from a first position thereof to a second position to cause pressure fluid operation of said follower valving means to a second position thereof thereby to close communication between said high speed primary and secondary conduits and to provide communication between said high speed primary conduit and said low speed secondary conduit, and means operable in response to operation of said leader valving means to said first position for returning said follower valving means to its said first position.

12. In a power transmission for motor vehicles, a speed ratio controlling device adapted to control a speed ratio drive through the transmission, a second speed ratio controlling device adapted to control another speed ratio drive through the transmission relatively slower than the first said drive, fluid pressure operated means for controlling operation of the first said device, second fluid pressure operated means for controlling operation of the second said device, a high speed secondary pressure fluid supply conduit for the first said device, a low speed secondary pressure fluid supply conduit for the second said device, a high speed primary pressure fluid supply conduit for said high speed secondary conduit, a low speed primary pressure fluid supply conduit for said low speed secondary conduit, primary valving means operable to selectively control supply of pressure fluid to said primary conduits, follower valving means operable to a first position thereof to provide communication between said high speed primary and secondary conduits and between said low speed primary and secondary conduits, leader valving means, means for operating said leader valving means from a first position thereof to a second position to cause pressure fluid operation of said follower valving means to a second position thereof thereby to close communication between said high speed primary and secondary conduits and to provide communication between said high speed primary conduit and said low speed secondary conduit, and means for venting said high speed secondary conduit when said leader and follower valving means are operated from their first said positions to their second said positions respectively.

13. In a power transmission for motor vehicles, a plurality of speed ratio controlling devices adapted respectively to control relatively high and low speed drives through the transmission, primary control means operable for effective selective operation of said devices, and secondary control means operable for effecting selective operation of said devices independently of selective operation of said primary control means, and means preventing said selective operation of said secondary control means when said primary control means is operated to effect operation of the device for controlling said relatively low speed drive.

14. In a power transmission for motor vehicles, a plurality of speed ratio controlling devices adapted respectively to control relatively high and low speed drives through the transmission, pressure fluid operated means for controlling operation of each of said devices, vehicle driver controlled means operable at the will of the driver to selectively control pressure fluid supply to said pressure fluid operated means, additional vehicle driver controlled means operable at the will of the driver to selectively control pressure fluid supply to said pressure fluid operated means, and means preventing said selective control by said additional driver controlled means when the first said driver controlled means operates to provide said relatively low speed drive.

15. In a power transmission for motor vehicles, a plurality of speed ratio controlling devices adapted respectively to control relatively high and low speed drives through the transmission, pressure fluid operated means for controlling operation of each of said devices, means operable to selectively control pressure fluid supply to said pressure fluid operated means, driver controlled means operable at the will of the driver to selectively control pressure fluid supply to said pressure fluid operated means, and means preventing said selective control by said driver controlled means when said selectively operable means operates to provide said relatively low speed drive.

16. In a power transmission for motor vehicles, gearing having a plurality of rotary control elements operably associated therewith to control selective speed ratio drives through the transmission, one of said speed ratio drives being relatively faster than another, a plurality of speed ratio controlling devices respectively frictionally engageable with said control elements, a plurality of pressure fluid operated means respectively adapted to operate said speed ratio controlling devices, driver manipulated primary control means for effecting selective variation of said speed ratio drives, said primary control means including a device having selective movement to a plurality of predetermined positions respectively corresponding to said speed ratio drives to effect pressure fluid application selectively to said pressure fluid operated means, and secondary control means for diverting pressure fluid application from that pressure fluid operated means which at such time is operated in accordance with the position of said selectively movable device in providing said relatively fast drive to another of said pressure fluid operated means independently of selective movement of said selectively movable device.

17. In a power transmission for motor vehicles, gearing having a plurality of speed ratio controlling devices operably associated therewith to control selective speed ratio drives through the transmission, one of said speed ratio drives being relatively faster than another, a plurality of pressure fluid operated means respectively adapted to operate said devices, driver manipulated primary control means for effecting selective variation of said transmission drives and including a device having selective movement to effect pressure fluid application selectively to said pressure fluid operated means, and secondary control means for diverting the application of pressure fluid from that pressure fluid operated means which provides said relatively fast drive to another of said pressure fluid operated means independently of selective movement of said selectively movable device.

18. In a power transmission for a motor vehicle provided with an engine throttle-adjusting mechanism having a throttle opening range of movement and a kick-down range of movement adjacent the end of the throttle-adjusting range in the direction of throttle opening movement, a plurality of speed ratio controlling devices adapted to control selective speed ratio drives through the transmission, a plurality of pressure fluid operated means for controlling operation of said devices, primary control means for effecting selective variation of said transmission drives and including a driver operated device having selective movement to effect pressure fluid control of said pressure fluid operated means, secondary control means operable in response to adjustment of said throttle-adjusting mechanism in said kick-down range of movement for controlling operation of said pressure fluid operated means independently of selective movement of said selectively movable device, and means preventing operation of said secondary control means during adjustment of said throttle-adjusting mechanism in said throttle opening range.

19. In a power transmission for a motor vehicle having an engine throttle-adjusting mechanism having a throttle opening range of movement and a kick-down range of movement adjacent the end of the throttle-adjusting range in the direction of throttle opening movement, a plurality of speed ratio controlling devices adapted to control selective speed ratio drives through the transmission, a plurality of pressure fluid operated means for controlling operation of said devices, primary control means for effecting selective variation of said transmission drives and including a device manipulated by the vehicle driver selectively to effect pressure fluid control of said pressure fluid operated means, and secondary control means mechanically connected to said throttle-adjusting mechanism for operation in response to adjustment of said throttle-adjusting mechanism in said kick-down range of movement for controlling said pressure fluid operated means independently of selective manipulation of said driver manipulated device.

20. In a power transmission for a motor vehicle having an engine throttle-adjusting mechanism, a plurality of speed ratio controlling devices adapted to control selective speed ratio drives through the transmission, a plurality of pressure fluid operated means respectively adapted to operate said devices, primary control means for effecting selective variation of said transmission drives and including a device having selective movement to effect pressure fluid application selectively to said pressure fluid operated means, and vacuum operated secondary control means operably connected to the intake system of the engine for operation in response to adjustment of said throttle-adjusting mechanism for diverting the application of pressure fluid from one of said pressure fluid operated means to another of said pressure fluid operated means independently of selective movement of said selectively movable device.

21. In a power transmission for a motor vehicle having an engine throttle-adjusting mechanism, a plurality of speed ratio controlling devices adapted to control selective speed ratio drives through the transmission, a plurality of pressure fluid operated motors respectively adapted to control operation of said devices, primary control means for effecting selective variation of said transmission drives and including primary valving means selectively operable to control pressure fluid application to said motors, secondary valving means operable to change the application of pressure fluid from one of said motors to another of said motors, and means operably connecting said secondary valving means with said throttle-adjusting mechanism for effecting said change in pressure fluid application in response to adjustment of said throttle-adjusting mechanism.

22. In a power transmission for a motor vehicle having an engine throttle-adjusting mechanism, a plurality of speed ratio controlling devices adapted to control selective speed ratio drives through the transmission, a plurality of pressure fluid operated motors respectively adapted to control operation of said devices, primary control means for effecting selective variation of said transmission drives and including primary valving means selectively operable to control pressure fluid application to said motors, secondary valving means operable to change the application of pressure fluid from one of said motors to another of said motors, and means utilizing the suction of the engine intake system for controlling operation of said secondary valving means in response to adjustment of said throttle-adjusting mechanism.

23. In a power transmission for a motor vehicle having an engine throttle-adjusting mechanism, a plurality of speed ratio controlling devices adapted respectively to control relatively high and low speed drives through the transmission, pressure fluid operated means for controlling operation of each of said devices, means operable to selectively control pressure fluid supply to said pressure fluid operated means, and means operably connected to the intake system of said engine and limited to operation of said selectively operable control means in providing said relatively high speed drive for selectively controlling pressure fluid delivery to said pressure fluid operated means in response to adjustment of said throttle-adjusting mechanism.

24. In a drive for a motor vehicle having an engine provided with a throttle valve actuator operable by the driver throughout a range of movement in adjusting the throttle valve between its extreme limits of opening and closing positions, a transmission having a plurality of speed ratio controlling devices adapted to respectively control a plurality of relatively differing high speed ratio drives and a relatively low speed ratio drive from the engine to the vehicle, means for effecting operation of said devices, and means limited to operation of the last said means in providing the highest of said drives and utilizing the engine intake suction under control of said throttle valve actuator for effecting change in the relative operation of at least two of said devices to vary the speed ratio drive.

25. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, a transmission for driving the vehicle from the engine in a plurality of variable speed ratio drives, means providing a drive through the transmission, means providing an additional drive through the transmission faster than that provided by the first said drive means, a pressure fluid motor operable to control said faster drive means, a source of liquid, means including a pump for supplying said liquid under pressure to said motor, and means operable in response to operation of said throttle valve actuator beyond its said range of movement for shutting off said pressure liquid supply from said pump to said motor.

26. In a valving mechanism, a casing having a bore, a sleeve fitting within said bore, said sleeve having a pair of circumferentially spaced recesses, said sleeve having a pair of ports formed therein and respectively establishing communication between the sleeve interior and said recesses, said ports being offset from each other in the direction of the axis of said sleeve, said recesses being so disposed relative to each other in the direction of said axis that a plane perpendicular to said axis may be passed through portions of both of said recesses, means for supplying pressure fluid to one of said recesses for passage through the sleeve interior to the other of said recesses, and a valve slidable in said sleeve to control said ports and thereby control passage of pressure fluid relatively between said recesses.

27. In a drive for a motor vehicle having an engine provided with a throttle actuator operable by the driver throughout a range of movement in adjusting the throttle between its limits of opening and closing positions, means accommodating driver operation of said actuator from its throttle closing position to the limit of its throttle opening position and therebeyond, transmission mechanism operable to provide at least three forward drives of relatively different predetermined fixed speed ratio from the engine to the vehicle, pressure fluid operated means for controlling at least the fastest of said drives, means for supplying pressure fluid to said pressure fluid operated means during operation of said fastest drive, means operable in response to operation of said throttle actuator beyond the limit of its said throttle opening position for effecting control of the operation of said pressure fluid operated means to step-down the speed ratio drive, said step-down control means being so arranged as not to change the transmission drive in either of the other two of said three drives, and means operable to effect operation and release of said other two drives independently of operation of said step-down control means as aforesaid.

28. In a drive for a motor vehicle having an engine provided wtih a throttle actuator operable by the driver, variable speed ratio driving mechanism for driving the vehicle from the engine in at least three relatively different forward speed ratios two of which are relatively fast vehicle driving speed ratios and another of which is a relatively slow vehicle driving speed ratio, transmission control mechanism operable at the will of the driver to accommodate operation of said forward speed ratio drives, and means operable in response to operation of said throttle actuator for stepping down the drive in said speed ratio driving mechanism only when said transmission control mechanism has been operated to accommodate operation of the faster of said two relatively fast driving speed ratios.

29. In a drive for a motor vehicle having an engine provided with a throttle actuator operable by the driver throughout a range of movement in adjusting the throttle between its limits of opening and closing positions, means accommodating driver operation of said actuator throughout its said range of movement and therebeyond, transmission mechanism operable to provide a plurality of speed ratio drives from the engine to the vehicle, pressure fluid operating means including a control valve therefor for controlling at least one of said drives, means operable in response to operation of said throttle actuator beyond its said range of movement to cause operation of said control valve to vent said pressure fluid operating means, and means operable to effect operation and release of other of said drives independently of operation of said control valve.

30. In a drive for a motor vehicle having an engine provided with a throttle actuator operable by the driver, transmission mechanism operable to provide a plurality of speed ratio drives from the engine to the vehicle, pressure fluid operated means for controlling at least one of said drives, a first valve movable by pressure fluid to control pressure fluid application to said pressure fluid operated means, a second valve operable to control pressure fluid movement of the first valve, and means for effecting operation of the second valve in response to operation of said throttle actuator.

31. In a drive for a motor vehicle having an engine provided with a throttle actuator operable by the driver, transmission mechanism operable to provide a plurality of speed ratio drives from the engine to the vehicle, pressure fluid operated means for controlling at least one of said drives, a first valve movable by pressure fluid to control pressure fluid application to said pressure fluid operated means, a second valve operable to control pressure fluid movement of the first valve, and means utilizing the partial vacuum of the engine intake system for effecting operation of the second valve in response to operation of said throttle actuator.

32. In a drive for a motor vehicle having an engine provided with a throttle actuator operable by the driver throughout a range of movement in adjusting the throttle between its limits of opening and closing positions, means accommodating driver operation of said actuator throughout its said range of movement to the limit of its throttle opening movement and therebeyond, transmission mechanism operable to provide a plurality of speed ratio drives from the engine to the vehicle, control means for said transmission mechanism adapted to be set by the vehicle driver to accommodate operation of said drives, one of said drives being relatively fast with respect to another of said drives which is relatively slow, a fluid coupling cooperably disposed with the engine and transmission mechanism for transmitting drive therebetween, and means operable in response to operation of said throttle actuator beyond its said range of movement for overruling the setting of the control means to prevent operation of said relatively fast drive while accommodating operation of said relatively slow drive, the motor vehicle drive being such as to permit acceleration of the vehicle in said relatively slow drive with said control means set to accommodate said relatively fast drive, said overruling means operating to restore the transmission mechanism to the setting of said control means in response to operation of said throttle actuator to within its said range of movement.

33. In a drive for a motor vehicle having an engine provided with a throttle actuator operable by the driver throughout a range of movement in adjusting the throttle between its limits of opening and closing positions, means accommodating driver operation of said actuator throughout its said range of movement to the limit of its throttle opening movement and therebeyond, a plurality of control elements adapted to control selective speed ratio drives through the transmission, a plurality of speed ratio controlling devices respectively engageable with said control elements, a plurality of pressure fluid operated means respectively adapted to operate said speed ratio controlling devices, primary driver manipulated control means for effecting selective variation of said speed ratio drives at the will of the vehicle driver, said primary control means including a device having selective movement to a plurality of predetermined positions respectively corresponding to said speed ratio drives to effect pressure fluid application selectively to said pressure fluid operated means, and secondary control means operable in response to driver operation of said throttle actuator beyond its said limit of throttle opening movement for diverting pressure fluid application from one of said pressure fluid operated means which at such time is operated in accordance with the position of said selectively movable device to another of said pressure fluid operated means independently of selective movement of said selectively movable device.

34. In a drive for a motor vehicle having an engine provided with a throttle actuator operable by the driver throughout a range of movement in adjusting the throttle between its limits of opening and closing positions, means accommodating driver operation of said actuator throughout its said range of movement to the limit of its throttle opening movement and therebeyond, a plurality of speed ratio controlling devices adapted to control selective speed ratio drives through the transmission, a plurality of pressure fluid operated means respectively adapted to control operation of said devices, primary control means adapted for manipulation by the vehicle driver for effecting selective variation of said transmission drives at the will of the driver and including a device having selective movement to effect pressure fluid control of said pressure fluid operated means, and secondary control means operable in response to driver operation of said throttle actuator beyond its said limit of throttle opening movement for diverting the application of pressure fluid from one of said pressure fluid operated means to another of said pressure fluid operated means independently of selective movement of said selectively movable device.

35. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow drive, and change speed means operable in response to operation of said throttle valve actuator beyond its said range of movement for effecting change in the drive through said transmission means from the faster of said pair of drives to another of said drives, said change speed means being incapable of effecting change in the drive through said transmission means by operation of said throttle valve actuator beyond its said range of movement when the slower of said pair of drives is operating.

36. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow drive, pressure fluid operated means for controlling operation of the faster of said pair of drives, means for conducting fluid under pressure to said pressure fluid operated means during operation of the faster of said pair of drives, change speed means operable in response to operation of said throttle valve actuator beyond its said range of movement for relieving the pressure of the fluid at said pressure fluid operating means thereby effecting change in the drive through said transmission means from the faster of said pair of drives to another of said drives, and means yieldingly acting to restore said throttle valve actuator from said position thereof beyond said range of movement to a position within said range of movement, said change speed means operating in response to restoration of said throttle valve actuator as aforesaid for restoring pressure fluid operation of said pressure fluid operated means thereby restoring operation of the faster of said pair of drives, said change speed means being incapable of effecting change in the drive through said transmission means by operation of said throttle valve actuator beyond its said range of movement when the slower of said pair of drives is operating.

37. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow drive, drive control means comprising a plurality of pressure fluid operated devices for controlling operation of said pair of drives, and change speed means operable in response to operation of said throttle valve actuator beyond its said range of movement for controlling operation of said drive control means for effecting change in the drive through said transmission means from the faster of said pair of drives to the slower of said pair of drives, said change speed means being incapable of effecting change in the drive through said transmission means by operation of said throttle valve actuator beyond its said range of movement when the slower of said pair of drives is operating.

38. In a drive for a motor vehicle having an engine provided with a throttle valve actuator operable by the driver throughout a range of movement in adjusting the throttle valve between its extreme limits of opening and closing positions, means accommodating driver operation of said actuator throughout its said range of movement and therebeyond, transmission means having a plurality of driving means of predetermined fixed speed ratio operable between the engine and vehicle to provide a relatively slow speed ratio drive and a pair of relatively different speed ratio drives each faster than said relatively slow drive, drive control means comprising a plurality of pressure fluid operated devices for controlling operation of said pair of drives, change speed means operable in response to operation of said throttle valve actuator beyond its said range of movement for controlling operation of said pair of drives for effecting change in the drive through said transmission means from the faster of said pair of drives to another of said drives, and means effecting operation and release of said relatively slow speed drive and the slower of said pair of drives independently of operation of said change speed means.

39. In a drive for a motor vehicle according to claim 25, and means operating to effect operation and release of the first recited drive means independently of operation of the throttle valve actuator beyond its said range of movement.

40. In a drive for a motor vehicle having an engine provided with a throttle actuator operable by the driver throughout a range of movement in adjusting the throttle between its limits of opening and closing positions, means accommodating driver operation of said actuator throughout its said range of movement to the limit of its throttle opening movement and therebeyond, transmission mechanism operable to provide at least three forward drives of relatively different predetermined fixed speed ratio from the engine to the vehicle, drive control means comprising a plurality of pressure fluid operated devices for controlling operation of said three drives, a control element cooperably associated with said throttle actuator for operation of the control element from a first position to a second position in response to operation of said throttle actuator beyond its said limit of throttle opening movement, said throttle actuator being movable from the limit of its throttle closing movement to the limit of its throttle opening movement without tending to cause operation of said control element from its said first position to its said second position, means operating in response to operation of said control element from its said first position to its said second position for controlling operation of said drive control means to effect control on the operation of said transmission mechanism to step-down the speed ratio drive, and means limiting operation of said step-down control means during operation of each of said three drives to vehicle drive in the fastest of said three drives.

41. In a drive for a motor vehicle having an engine provided with a throttle actuator operable by the driver throughout a range of movement in adjusting the throttle between its limits of opening and closing positions, means accommodating driver operation of said actuator throughout its said range of movement to the limit of its throttle opening movement and therebeyond, transmission mechanism operable to provide at least three forward drives of relatively different predetermined fixed speed ratio from the engine to the vehicle, a control element cooperably associated with said throttle actuator for operation of the control element from a first position to a second position in response to operation of said throttle actuator beyond its said limit of throttle opening movement, said throttle actuator being movable from the limit of its throttle closing movement to the limit of its throttle opening movement without tending to cause operation of said control element from its said first position to its said second position, means operating in response to operation of said control element from its said first position to its said second position to effect control on the operation of said transmission mechanism to step-down the speed ratio drive from the fastest to another of said three drives, and means effecting operation and release of each of the other two of said three drives independently of operation of said control element from its said first position to its said second position for changing the drive through the transmission mechanism.

42. In a drive for a motor vehicle having an engine provided with a throttle actuator operable by the driver throughout a range of movement in adjusting the throttle between its limits of opening and closing positions, means accommodating driver operation of said actuator throughout its said range of movement to the limit of its throttle opening movement and therebeyond, transmission mechanism operable to provide at least three forward drives of relatively different predetermined fixed sped ratio from the engine to the vehicle, a control element cooperably associated with said throttle actuator for operation of the control element from a first position to a second position in response to operation of said throttle actuator beyond its said limit of throttle opening movement, said throttle actuator being movable from the limit of its throttle closing movement to the limit of its throttle opening movement without tending to cause operation of said control element from its said first position to its said second position, means operating in response to operation of said control element from its said first position to its said second position to effect control on the operation of said transmission mechanism to step-down the speed ratio drive from the fastest to another of said three drives, means effecting operation and release of each of the other two of said three drives independently of operation of said control element from its said first position to its said second position for changing the drive through the transmission mechanism, and a fluid coupling cooperably disposed with the engine and transmission mechanism for transmitting drive therebetween such that said fluid coupling provides a slip drive between the engine and transmission mechanism thereby facilitating acceleration of the vehicle by allowing the engine to race ahead of the vehicle and operate at a relatively favorable torque output, said fastest of said three drives constituting the normal speed ratio drive of the vehicle for both relatively slow city driving and relatively fast country driving.

43. In a drive for a motor vehicle having an engine, transmission mechanism comprising pressure fluid operated means to control a speed ratio drive from the engine to the vehicle, a follower valve movable by pressure fluid to effect release of said pressure fluid operated means, a leader valve operable to control pressure fluid movement of the follower valve, and means for operating the leader valve.

44. In a drive for a motor vehicle having an engine, transmission mechanism comprising pressure fluid operated means to control a speed ratio drive from the engine to the vehicle, a follower valve movable by pressure fluid to control operation of said pressure fluid operated means, a leader valve operable from a first venting position to a second position for supplying pressure fluid to said follower valve to cause movement thereof, means for conducting pressure fluid from said leader valve when in said second position to said follower valve, means for operating said leader valve between the aforesaid positions, and means for venting said pressure fluid conducting means in response to movement of said leader valve from said second position to said first position.

45. In a drive for a motor vehicle having an engine provided with a throttle actuator operable by the driver throughout a range of movement in adjusting the throttle between its limits of opening and closing positions, means accommodating driver operation of said actuator throughout its said range of movement to the limit of its throttle opening movement and therebeyond, a plurality of speed ratio controlling devices adapted to control forward vehicle drives of relatively different predetermined speed ratio, one of said drives providing a relatively fast drive for the vehicle and another of said drives providing a relatively slow drive for the vehicle, a plurality of pressure fluid operated means for controlling operation of said devices, a selector element mounted for hand-manipulation at the will of the driver independently of driver operation of the throttle control such that said selector element may be moved between positions respectively accommodating operation of said fast and slow drives, means operable in response to said manipulation of said selector element to selectively control operation of said plurality of pressure fluid operated means, means operating in response to driver operation of said throttle-control beyond its said limit of throttle opening movement for controlling operation of said relatively fast drive when this drive is operating with said selector element positioned to accommodate this drive.

46. In a drive for a motor vehicle having an engine provided with a throttle actuator operable by the driver throughout a range of movement in adjusting the throttle between its limits of opening and closing positions, transmission mechanism operable to provide a plurality of speed ratio drives from the engine to the vehicle, control means for said transmission mechanism adapted to be set by the vehicle driver to accommodate operation of said drives, one of said drives being relatively fast with respect to another of said drives which is relatively slow, a fluid coupling cooperably associated with the engine and transmission mechanism for transmitting drive therebetwen such that said fluid coupling provides a slip in the drive facilitating acceleration of the vehicle from rest by allowing the engine to race ahead of the vehicle and operate at a relatively favorable torque output, said relatively fast drive constituting the normal speed ratio drive of the vehicle for both relatively slow city driving and relatively fast country driving, means operable under control of said throttle actuator when operated by the driver first in the direction of its throttle opening movement and then released to accommodate operation of said throttle actuator in the direction of its throttle closing movement for controlling operation of the transmission mechanism such that, with said driver-set control means set to accommodate operation of said relatively fast drive, operation of said relatively fast drive will be delayed and the vehicle started from rest in said relatively slow drive, said relatively fast drive being established upon driver release of said throttle actuator as aforesaid.

47. In a drive for a motor vehicle having an engine provided with an intake system; transmission mechanism comprising means for driving the vehicle in a relatively slow speed ratio drive and means for driving the vehicle in a relatively fast speed ratio drive; a reciprocatory control member; means at all times subjecting said control member to communication with said intake system thereby to cause drive-controlling movement of the control member in one direction of reciprocation thereof; a spring yieldingly opposing said movement of said control member and adapted to cause drive-controlling movement of the control member in the other direction of reciprocation thereof; drive control means operable under control of the vehicle driver to effect change in the vehicle drive from each of said speed ratio driving means to the other independently of said drive-controlling movements of said control member; and means responsive to one of said drive-controlling movements of said control member for preventing said operation of said drive control means.

OTTO W. SCHOTZ.